United States Patent
Lee et al.

(10) Patent No.: US 8,045,115 B2
(45) Date of Patent: *Oct. 25, 2011

(54) LIQUID CRYSTAL DISPLAY WITH DIFFERENT TWISTING DIRECTIONS OF LIQUID CRYSTAL MOLECULES

(75) Inventors: Ju-Hyun Lee, Oviedo, FL (US);
Shin-Tson Wu, Orlando, FL (US);
Wang-Yang Li, Tainan County (TW);
Chung-Kuang Wei, Taipei (TW)

(73) Assignees: Chimei Innolux Corporation, Miaoli County (TW); University of Central Florida Research Foundation, Inc,, Orlando, FL (US)

( * ) Notice: Subject to any disclaimer, the term of this patent is extended or adjusted under 35 U.S.C. 154(b) by 1294 days.

This patent is subject to a terminal disclaimer.

(21) Appl. No.: 11/645,098

(22) Filed: Dec. 22, 2006

(65) Prior Publication Data
US 2008/0151148 A1    Jun. 26, 2008

(51) Int. Cl.
*G02F 1/1337* (2006.01)
*C09K 19/02* (2006.01)

(52) U.S. Cl. ........ 349/133; 349/179; 349/180; 349/184; 349/185; 349/123; 349/132; 349/171; 349/172; 349/174

(58) Field of Classification Search .......... 349/123, 349/179, 126, 127, 130, 131, 132, 133, 134, 349/168–172, 174, 175, 177, 180, 183–186
See application file for complete search history.

(56) References Cited

U.S. PATENT DOCUMENTS

| | | | | |
|---|---|---|---|---|
| 4,653,865 A * | 3/1987 | Kando et al. | ................... | 349/101 |
| 5,477,358 A | 12/1995 | Rosenblatt et al. | ............. | 359/77 |
| 5,488,499 A * | 1/1996 | Tanaka et al. | ................. | 349/177 |
| 5,745,206 A * | 4/1998 | Koike et al. | .................... | 349/129 |
| 6,281,952 B1 | 8/2001 | Okamoto et al. | ............... | 349/12 |
| 6,603,522 B1 * | 8/2003 | Kaneko | .......................... | 349/117 |
| 2003/0067570 A1 * | 4/2003 | Okamoto et al. | ............. | 349/113 |
| 2004/0085508 A1 * | 5/2004 | Paukshto et al. | .............. | 349/179 |

OTHER PUBLICATIONS

Zhu et al., "Transflective Liquid Crystal Displays", *IEEE / OSA J. Display Tech.*, V. 1, No. 1, pp. 15-29 (2005).
Wu et al., "Chiral-homeotropic liquid crystal cells for high contrast and low voltage displays", *J. Appl. Phys.*, V. 82(10), pp. 4795-4799 (1997).
Schadt and Helfrich, "Voltage-Dependent Optical Activity of a Twisted Nematic Liquid Crystal", *Appl. Phys. Lett.*, V. 18, No. 4, pp. 127-128 (1971). Suh et al., "Novel electro-optic effect associated with a homeotropic to twisted-planar transition in nematic liquid crystals", *Appl. Phys. Lett.*, V. 68(20), pp. 2819-2821 (1996).
Schiekel and Fahrenschon, "Deformation of Nematic Liquid Crystals with Vertical Orientation in Electrical Fields", *App. Phys. Lett.*, V. 19, No. 10, pp. 391-393 (1971).

* cited by examiner

*Primary Examiner* — Hoan C Nguyen
*Assistant Examiner* — Phu Vu
(74) *Attorney, Agent, or Firm* — Fish & Richardson P.C.

(57) ABSTRACT

A liquid crystal display includes a first alignment film having a first alignment direction, a second alignment film having a second alignment direction, and a liquid crystal layer having liquid crystal molecules between the first and second alignment films. The liquid crystal layer is doped with a chiral material that tends to induce a first twist in directors of the liquid crystal molecules when an electric field is applied to the liquid crystal layer. The first and second alignment films have orientations that tends to induce a second twist in the directors when an electric field is applied to the liquid crystal layer, in which the direction of the first twist is different from the direction of the second twist.

28 Claims, 14 Drawing Sheets

LIQUID CRYSTAL DISPLAY WITH DIFFERENT TWISTING DIRECTIONS OF LIQUID CRYSTAL MOLECULES

The subject matter disclosed in this patent application was developed under a joint research agreement between Chi Mei Optoelectronics and University of Central Florida.

CROSS-REFERENCE TO RELATED APPLICATIONS

This application is related to concurrently filed application Ser. No. 11/645,231, titled "Liquid Crystal Display", the contents of which are incorporated by reference.

BACKGROUND OF THE INVENTION

The description relates to liquid crystal displays.

Liquid crystal displays (LCDs) can be used in, e.g., portable devices, computers displays, and high definition televisions. A liquid crystal display can have a liquid crystal layer and two crossed linear polarizers for modulating light using an electro-optic effect. An external voltage applied to the liquid crystal layer changes the orientations of the liquid crystal molecules and the optical phase retardation of the liquid crystal layer, thereby changing the amount of light that passes the crossed linear polarizers. Each pixel of the display can show a range of gray scale levels depending on the voltage applied to the liquid crystal layer. Color filters can be used to filter light to generate color.

The optical characteristics of a liquid crystal display are affected by the molecular arrangements of liquid crystal molecules when no voltage is applied (referred to as the "initial state") and when voltages are applied (referred to as the "operation state") to the liquid crystal layer. The initial arrangement of the liquid crystal molecules can be determined by, e.g., surface boundary conditions. The liquid crystal layer is between two substrates, and the surface boundary conditions can be controlled by alignment layers attached to the substrates. Each alignment layer can be, e.g., a thin film of organic (e.g., polymer) or inorganic material(s).

The liquid crystal molecules are initially aligned perpendicular or parallel to the surface of the alignment layer with a small inclination (pretilt) along a certain direction. The direction of inclination or tilt defines the molecular reorientation direction in the operation state. The amount of the inclination is called a pretilt angle. The surface structure of the alignment layer that defines the surface pretilt angle can be obtained by buffing the organic alignment layer, exposing polarized or unpolarized light from an inclined direction on the organic alignment layer, or inclined deposition of an inorganic alignment layer. When a voltage is applied to the liquid crystal layer in the operation state, the applied electric field exerts a torque on the liquid crystal molecules due to dielectric anisotropy of the molecules. The initial structure of the liquid crystal layer together with the molecular reorientation scheme defines a liquid crystal mode. Different liquid crystal modes can be used in different applications.

For example, displays having different sizes can use different liquid crystal modes due to considerations in device fabrication complexity, manufacturing costs, and system performances. For small and mid-sized screens (e.g., those used in mobile phones and computer monitors), a twisted nematic (TN) mode can be used. TN displays are described in "Voltage-Dependent Optical Activity of a Twisted Nematic Liquid Crystal," by M. Schadt et al., Applied Physics Letters, Vol. 18, p. 127 (1971). TN displays can be reliable to operate and simple to manufacture. In a TN display, two substrates are provided with alignment layers that align the liquid crystal molecules parallel to the substrate surfaces in the initial state. The top and the bottom alignment layers are rubbed along orthogonal directions. Due to this boundary condition, the liquid crystal layer has a twisted structure when no voltage is applied to the liquid crystal layer. This twisted structure changes the polarization state of light that passes the liquid crystal layer due to birefringence and wave guiding effects. The wave guiding effect provides a high transmittance efficiency at the bright state with low color dispersion, compared to other liquid crystal modes that uses only the birefringence effect for the bright state.

The term "twisted structure" refers to a condition of the liquid crystal layer in which the orientations of the directors of the liquid crystal molecules are different at different positions along a vertical direction. The twisted structure can be similar to a helix. A clockwise twist direction means that the liquid crystal molecules have orientations that rotate in the clockwise direction as the liquid crystal molecules move from positions closer to the back side of the display to positions closer to the front side of the display (similar to a left handed helix). A counter clockwise twist direction means that the liquid crystal molecules have orientations that rotate in the counter clockwise direction as the liquid crystal molecules from positions closer to the back side of the display to positions closer to the front side of the display (similar to a right handed helix).

The TN display can be switched to a dark state by applying an operation voltage to the liquid crystal layer, causing the liquid crystal molecules to be oriented perpendicular to the substrate surface. In the dark state, there can be light leakage caused by optical retardation at the surface regions of the liquid crystal layer because the liquid crystal molecules near the surface regions are not switched perpendicular to the substrate due to the binding force of the alignment layers.

In another liquid crystal mode, referred to as the vertical alignment (VA) mode, the liquid crystal molecules are initially aligned in the vertical direction (i.e., perpendicular to the surface of the substrates). There are two types of VA modes. The first type uses a birefringence effect to control brightness, and is referred to as the electrically controlled birefringence (ECB) VA mode. See "Deformation of Nematic Liquid Crystals with Vertical Orientation in Electrical Fields," by M. F. Schiekel et al., Applied Physics Letters, Vol. 19, p. 391 (1971). The ECB VA mode uses alignment layers that align the liquid crystal molecules perpendicular to the substrate surface. The rubbing directions of the top and bottom alignment layers are opposite to each other. To achieve a high brightness, the optic axes of the top and bottom polarizers have transmission axes oriented at 45 degrees relative to the rubbing directions of the alignment layers.

Note that the terms "vertical" and "horizontal" are used to describe the relative orientations of various components of the display. The components can have different orientations.

A second type of VA mode, referred to as a "chiral homeotropic mode" or a "homeotropic-to-twisted planar switching mode," has the advantages of ECB VA mode (e.g., high contrast image) and TN mode (e.g., high brightness and low color dispersion). See "Novel electro-optic effect associated with a homeotropic to twisted-planar transition in nematic liquid crystals," Seong-Woo Suh et al., Applied Physics Letters, 68, p. 2819 (1996) and "Chiral-homeotropic liquid crystal cells for high contrast and low voltage displays," by Shin-Tson Wu et al., Journal of Applied Physics, 82, p. 4795 (1997). The chiral homeotropic mode LCD can use a negative dielectric anisotropy liquid crystal material mixed with a small amount of chiral material.

In a chiral homeotropic mode LCD, the liquid crystal layer is sandwiched between two glass substrates that are coated with a thin layer of transparent and conductive electrode (e.g., indium tin oxide) and subsequently over-coated with a thin organic (e.g., polyimide) or inorganic (e.g., $SiO_2$) alignment layer. The alignment layer can align the liquid crystal molecules perpendicular to the substrate surfaces in the initial state. When a voltage is applied to the liquid crystal layer, the chiral material introduces a twisted structure in the liquid crystal layer.

The tilt direction of the alignment layers on the bottom and top substrates can be different. The angle between the two tilt directions can be, e.g., 90 degrees. The different tilt directions introduce a twisted structure in the liquid crystal layer when a voltage is applied to the liquid crystal layer. The tilt directions of the alignment layers are configured to cause the liquid crystal molecules to form a twisted structure in the liquid crystal layer, in which the twist direction of the twisted structure is the same as the twist direction caused by the chiral material.

For example, if the twisted structure caused by the chiral material has a clockwise twist direction, then the tilt directions of the alignment layers are configured to cause the liquid crystal molecules to form a twisted structure having a clockwise twist direction. Conversely, if the twisted structure caused by the chiral material has a counter clockwise twist direction, then the tilt directions of the alignment layers are configured to cause the liquid crystal molecules to form a twisted structure having a counter clockwise twist direction.

The chiral homeotropic LCD has polarizers that are crossed, i.e., have transmission axes that are oriented orthogonally. The tilt direction of one of the alignment layers is parallel to one of the transmission axes of the crossed polarizers. In the initial state, the liquid crystal molecules are aligned in the vertical direction and light does not pass the crossed polarizers, resulting in a dark image. This is similar to the situation in the ECB VA mode. In the operation state, an electric field in the vertical direction is applied to the liquid crystal layer. Because the liquid crystal molecules have negative dielectric anisotropy, the applied electric field tends to reorient the liquid crystal molecules toward the horizontal direction. Due to the effect from the different tilt directions on the alignment layers and the effect from the chiral material, the liquid crystal molecules in the bulk area form a twisted structure. The twisted structure in the bulk area of the chiral homeotropic mode LCD is similar to that of the TN mode LCD and has optical properties similar to those of the TN mode LCD.

SUMMARY

In one aspect, in general, a liquid crystal display includes a first alignment film having a first alignment direction, a second alignment film having a second alignment direction, and a liquid crystal layer having liquid crystal molecules between the first and second alignment films. The liquid crystal layer is doped with a chiral material that tends to induce a first twist in directors of the liquid crystal molecules when an electric field is applied to the liquid crystal layer. The first and second alignment films have orientations that tend to induce a second twist in the directors when an electric field is applied to the liquid crystal layer, in which the direction of the first twist is different (e.g., opposite) from the direction of the second twist.

Implementations of the apparatus may include one or more of the following features. In some examples, the first and second alignment films tend to induce a counter-clockwise twist in the directors of the liquid crystal molecules, and the chiral material tends to induce a clockwise twist in the directors. In some examples, the orientations of the first and second alignment films tend to induce a clockwise twist in the directors of the liquid crystal molecules, and the chiral material tends to induce a counter-clockwise twist in the directors. When a pixel of the liquid crystal display is in a bright state, at least one-tenth, or at least one-half, or at least two-thirds, of the liquid crystal molecules in the pixel form a twisted structure having a twist direction that is opposite to the twist direction of a portion of the twisted structure formed by liquid crystal molecules adjacent to the first and second alignment films. The liquid crystal molecules are substantially normal to the first and second alignment films when no voltage is applied to the liquid crystal layer, and the liquid crystal modules tilt away from the substantially normal direction when an electric field is applied to the liquid crystal layer. The first alignment layer is attached to a first substrate and the second alignment layer is attached to a second substrate.

The liquid crystal layer includes negative dielectric anisotropy liquid crystal material. The apparatus includes a backlight to provide light that is modulated by the liquid crystal layer. The apparatus includes electrodes to apply the voltage to the liquid crystal layer. The apparatus includes a first polarizing film having a first transmission axis and a second polarizing film having a second transmission axis, the first transmission axis being at an angle relative to the second transmission axis, the first and second polarizing films being positioned at opposite sides of the liquid crystal layer. In some examples, the bisector of the angle between the first and second alignment layers is substantially parallel to the bisector of the angle between the first and second transmission axes. In some examples, the bisector of the angle between the first and second alignment layers is substantially orthogonal to the bisector of the angle between the first and second transmission axes. The display is at a dark state when no voltage is applied to the liquid crystal layer. The first alignment direction is at an angle of 60 to 120 degrees with respect to the second alignment direction. A pitch of the twist induced by the chiral material ranges from 3 to 6 times the thickness of the liquid crystal layer.

In another aspect, in general, a transmissive type liquid crystal display includes a first substrate having a first electrode and a first alignment film, a second substrate having a second electrode and a second alignment film, a liquid crystal layer having liquid crystal molecules between the first and second substrates, and a backlight to generate light that is modulated by the liquid crystal layer. The liquid crystal layer is doped with a chiral material that tends to induce a twisted structure in the liquid crystal layer when an electric field is applied to the liquid crystal layer using the first and second electrodes. The first alignment film has a first alignment direction, the second alignment film has a second alignment direction, and the first and second alignment films have orientations that tend to induce a twisted structure in the liquid crystal layer when an electric field is applied to the liquid crystal layer. The direction of twist of the twisted structure induced by the first and second alignment films is different (e.g., opposite) from the direction of twist of the twisted structure induced by the chiral material.

Implementations of the display may include one or more of the following features. The liquid crystal molecules are substantially parallel to a direction perpendicular to the first and second substrates when no electric field is applied to the liquid crystal layer. In some examples, the first and second alignment films tend to induce a counter-clockwise twist in the directors of the liquid crystal molecules, and the chiral material tends to induce a clockwise twist in the directors. In some examples, the first and second alignment films tend to induce a clockwise twist in the directors of the liquid crystal molecules, and the chiral material tends to induce a counter-clockwise twist in the directors. When a pixel of the liquid crystal display is in a bright state, the directors of at least one-tenth, or at least one-half, or at least two-thirds, of the liquid crystal molecules in the pixel twist in a direction that is opposite to the twist direction of a portion of the directors of liquid crystal molecules adjacent to the first and second alignment films.

In another aspect, in general, a liquid crystal display includes a lower alignment film having a first alignment direction, an upper alignment film having a second alignment direction, the upper alignment film being closer to a user viewing the display, and a liquid crystal layer having liquid crystal molecules between the first and second alignment films, in which the liquid crystal layer is doped with a chiral material. The chiral material includes substantially right-handed chiral material if the lower and upper alignment films are oriented such that the second alignment direction is at an angle less than 180 degrees relative to the first alignment direction when the angle is measured clockwise from the first alignment direction to the second alignment direction. The chiral material includes substantially left-handed chiral material if the lower and upper alignment films are oriented such that the second alignment direction is at an angle less than 180 degrees relative to the first alignment direction when the angle is measured counter clockwise from the first alignment direction to the second alignment direction.

Implementations of the display may include one or more of the following features. The chiral material includes substantially right-handed chiral material, and the lower and upper alignment films are oriented such that the second alignment direction is at an angle between 80 to 100 degrees relative to the first alignment direction when the angle is measured clockwise from the first alignment direction to the second alignment direction. The chiral material includes substantially left-handed chiral material, and the lower and upper alignment films are oriented such that the second alignment direction is at an angle between 80 to 100 degrees relative to the first alignment direction when the angle is measured counter clockwise from the first alignment direction to the second alignment direction.

In another aspect, in general, a liquid crystal display includes a lower alignment film having a first alignment direction, an upper alignment film having a second alignment direction, the upper alignment film being closer to a user when the user views the display, and a liquid crystal layer having liquid crystal molecules between the first and second alignment films. The liquid crystal layer is doped with a chiral material. The chiral material is selected to induce a right-handed twisted structure in the liquid crystal layer when an electric field is applied to the liquid crystal layer if the lower and upper alignment films are oriented such that the second alignment direction is at an angle less than 180 degrees relative to the first alignment direction when the angle is measured clockwise from the first alignment direction to the second alignment direction. The chiral material is selected to induce a left-handed twisted structure in the liquid crystal layer when an electric field is applied to the liquid crystal layer if the lower and upper alignment films are oriented such that the second alignment direction is at an angle less than 180 degrees relative to the first alignment direction when the angle is measured counter clockwise from the first alignment direction to the second alignment direction.

Implementations of the display may include one or more of the following features. The chiral material is selected to induce a right-handed twisted structure in the liquid crystal layer when an electric field is applied to the liquid crystal layer, and the lower and upper alignment films are oriented such that the second alignment direction is at an angle between 80 to 100 degrees relative to the first alignment direction when the angle is measured clockwise from the first alignment direction to the second alignment direction. The chiral material is selected to induce a left-handed twisted structure in the liquid crystal layer when an electric field is applied to the liquid crystal layer, and the lower and upper alignment films are oriented such that the second alignment direction is at an angle between 80 to 100 degrees relative to the first alignment direction when the angle is measured counter clockwise from the first alignment direction to the second alignment direction.

In another aspect, in general, a liquid crystal display includes a pixel circuit having a dark state and a bright state, the pixel circuit including a lower alignment film having a first alignment direction, an upper alignment film having a second alignment direction, the upper alignment film being closer to a user when the user views the display. The display includes a liquid crystal layer having liquid crystal molecules between the first and second alignment films, in which the liquid crystal layer is doped with a chiral material. When the pixel circuit is in the bright state, the chiral material induces at least one-tenth, or at least one-half, or at least two-thirds, of the liquid crystal molecules that are farther away from the upper and lower alignment films to form a twisted structure having a twist direction that is opposite to the twist direction of a portion of the twisted structure formed by liquid crystal molecules closer to the upper or lower alignment film.

In another aspect, in general, a liquid crystal display includes a lower alignment film having a first alignment direction, an upper alignment film having a second alignment direction, the upper alignment film being closer to a user when the user views the display, and a liquid crystal layer having liquid crystal molecules between the upper and lower alignment films. During a bright state, the liquid crystal layer has a light polarization rotation structure that rotates polarization of light propagating from the lower alignment film to the upper alignment film in a sequence of counter clockwise direction, clockwise direction, and counter clockwise direction if the first and second alignment films are oriented such that the second alignment direction is at an angle between 80 to 100 degrees relative to the first alignment direction when the angle is measured counter clockwise from the first alignment direction to the second alignment direction, in which the light propagates from the lower alignment film to the upper alignment film. The liquid crystal layer has a light polarization rotation structure that rotates polarization of light propagating from the lower alignment film to the upper alignment film in a sequence of clockwise direction, counter clockwise direction, and clockwise direction if the first and second alignment films are oriented such that the second alignment direction is at an angle between 80 to 100 degrees relative to the first alignment direction when the angle is measured clockwise from the first alignment direction to the second alignment direction.

Implementations of the display may include one or more of the following features. The liquid crystal layer is doped with a right-handed chiral material if the first and second alignment films are oriented such that the second alignment direction is at an angle between 80 to 100 degrees relative to the first alignment direction when the angle is measured clockwise from the first alignment direction to the second alignment direction. The liquid crystal layer is doped with a left-handed chiral material if the first and second alignment films are oriented such that the second alignment direction is at an angle between 80 to 100 degrees relative to the first alignment direction when the angle is measured counter clockwise from the first alignment direction to the second alignment direction.

In another aspect, in general, a method includes applying an electric field across a liquid crystal layer between a first alignment film and a second alignment film to tilt liquid crystal molecules in the liquid crystal layer away from a direction perpendicular to the first alignment film, and using a chiral material doped in the liquid crystal layer to induce a twist in directors of the liquid crystal molecules. The direction of twist induced by the chiral material is different (e.g., opposite) from a direction of twist that would have been induced by the first and second alignment films without the chiral material.

Implementations of the method may include one or more of the following features. In some examples, the chiral material is used to induce a counter clockwise twist, in which the direction of twist that would have been induced by the first and second alignment films is clockwise. In some examples, the chiral material is used to induce a clockwise twist, in which the direction of twist that would have been induced by the first and second alignment films is counter clockwise. Applying an electric field includes applying an electric field to cause a pixel of the liquid crystal display to enter a bright state and causing the directors of at least one-tenth, or at least one-half, or at least two-thirds, of the liquid crystal molecules in the pixel to twist in a direction that is opposite to the twist direction of a portion of the directors of liquid crystal molecules adjacent to the first and second alignment films.

The method includes generating light using a backlight and modulating the light using the liquid crystal layer. The method includes applying an electric field to cause a pixel of the liquid crystal display to enter a bright state, and removing the electric field to cause the pixel to enter a dark state. The method includes forming a twisted structure in the liquid crystal layer in which the pitch of the twisted structure ranges from 3 to 6 times the thickness of the liquid crystal layer.

Advantages and features of the apparatuses and methods may include one or more of the following. A transmissive display using a chiral material having a twist different (e.g., opposite) to the twist direction induced by alignment layers can have very little color dispersion. In the bright state, the polarization of light is changed due to the polarization rotating (wave guiding) effect caused by twisted structure of liquid crystal layer and the phase retardation effect caused by the reversely twisted structure in the bulk area.

DETAILED DESCRIPTION

Figure 1:
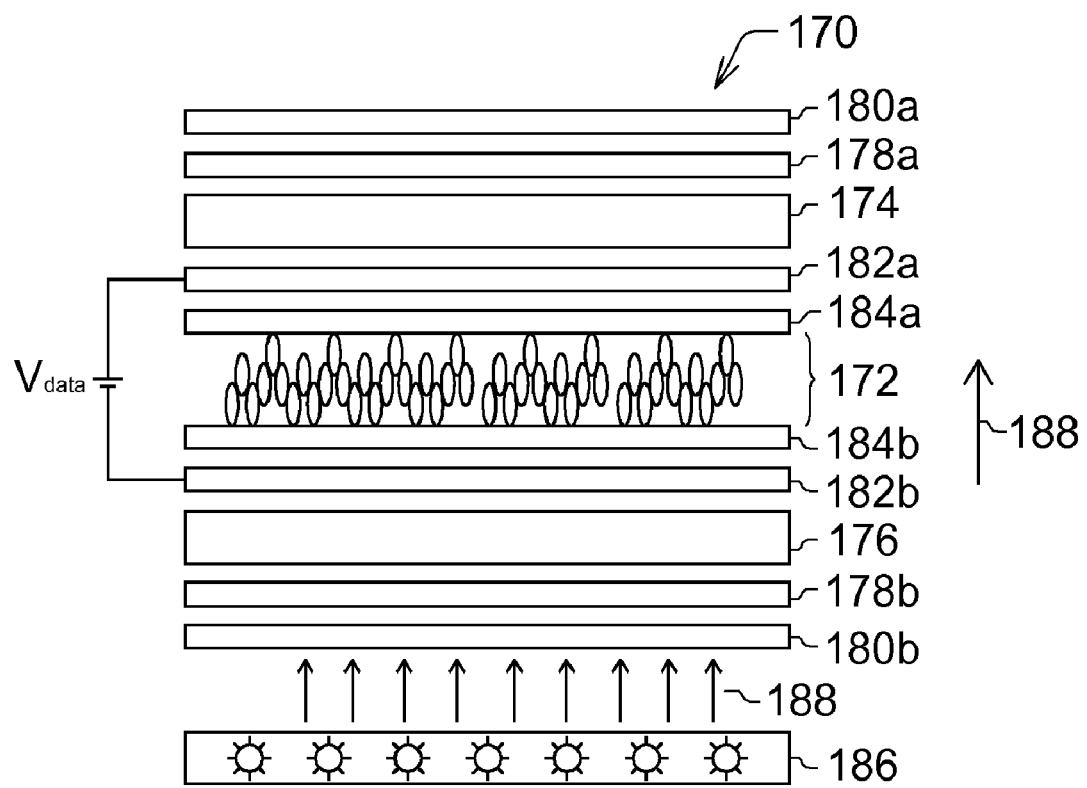
FIG. 1 is a cross sectional diagram of a liquid crystal display according to an embodiment of the invention.

FIG. 1 is a cross sectional diagram of a vertical alignment mode liquid crystal display 170 using a chiral material that induces a twisted structure in a liquid crystal layer 172 having a twist direction that is opposite to the twist direction induced by alignment layers. The liquid crystal layer 172 is positioned between an upper substrate 174 and a lower substrate 176 that are parallel to each other. Broadband quarter wave retardation films 178a and 178b are attached on the outer side of upper and lower substrates 174 and 176, respectively. Linear polarizers 180a and 180b are attached to the retardation films 178a and 178b, respectively. The retardation films 178a and 178b can be selected to achieve a wide viewing angle. The inner sides of the substrates 174 and 176 have transparent electrodes 182a and 182b coated with alignment layers 184a and 184b, respectively. A backlight module 186 generates light 188 that is modulated by the various layers. A data voltage Vdata is applied to the electrodes 182a and 182b to control the orientation of liquid crystal molecules in the liquid crystal layer 172 so that the light 188 after modulation has a specified gray scale level.

Figure 13:
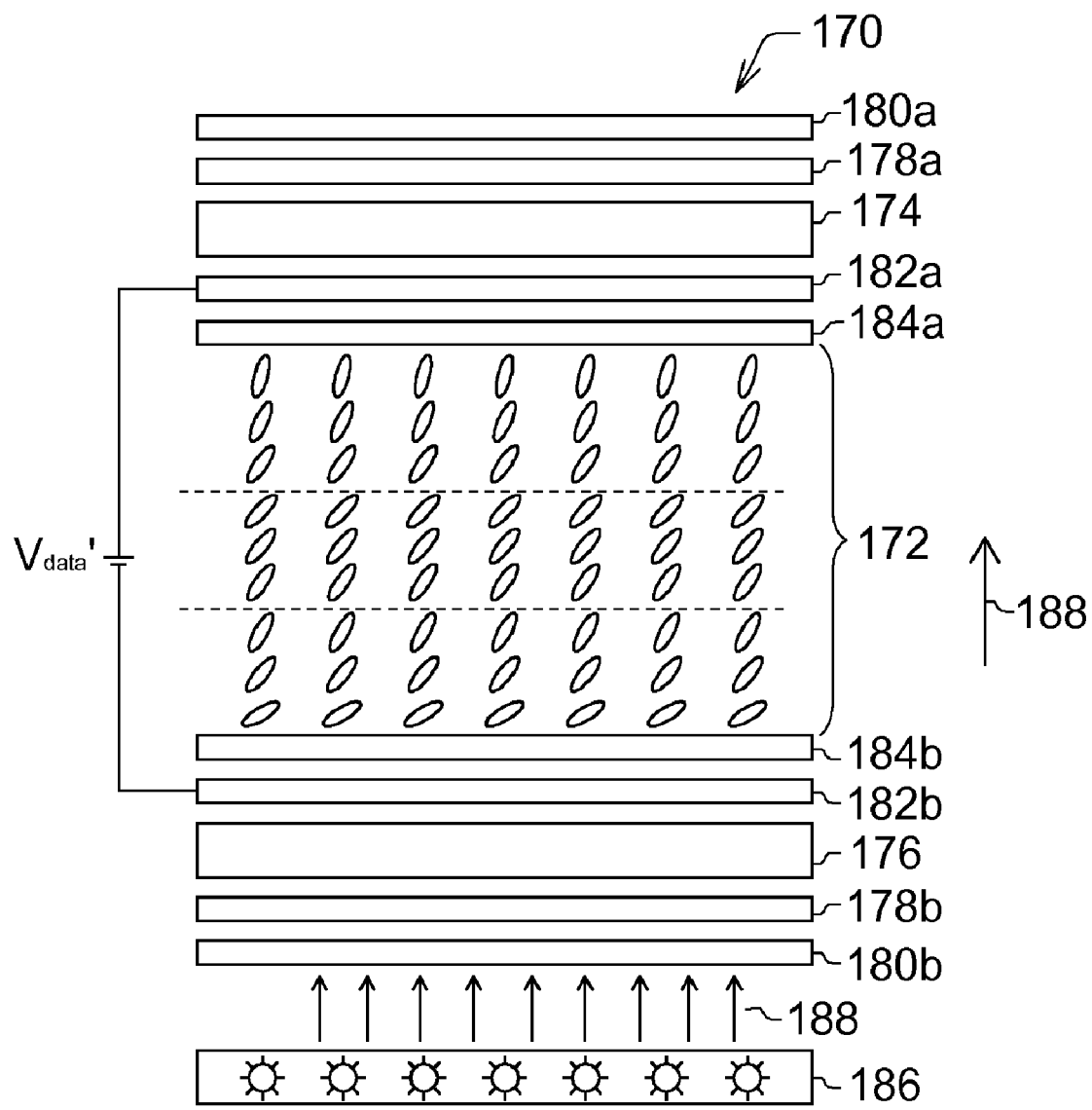
FIG. 13 is a crossed sectional schematic diagram of a liquid crytal display according to another embodiment of the invention.

The liquid crystal layer 172 has a liquid crystal material having a negative dielectric anisotropy. The liquid crystal layer 172 is doped with a chiral material, such as CB15 for left-handed twisted structure or S8111 for right-handed twisted structure. The chiral materials CB15 and S8111 are available from Merck, Japan. When the voltage Vdata is below a threshold (e.g., 2.5 V), the liquid crystal molecules are aligned substantially along a direction 188 perpendicular to the surface of the substrates 174 and 176 (shown in FIG. 1). In this example, the surfaces of the substrates 174 and 176 are parallel to the horizontal direction, and the direction 188 is parallel to the vertical direction. When the voltage Vdata exceeds the threshold, the chiral material induces a twisted structure in the liquid crystal layer 172. The alignment layers 184a and 184b each has a surface pretilt angle that determines the tilt direction of the liquid crystal molecules adjacent to the alignment layers 184a and 184b (shown in FIG.13).

Figure 2A:
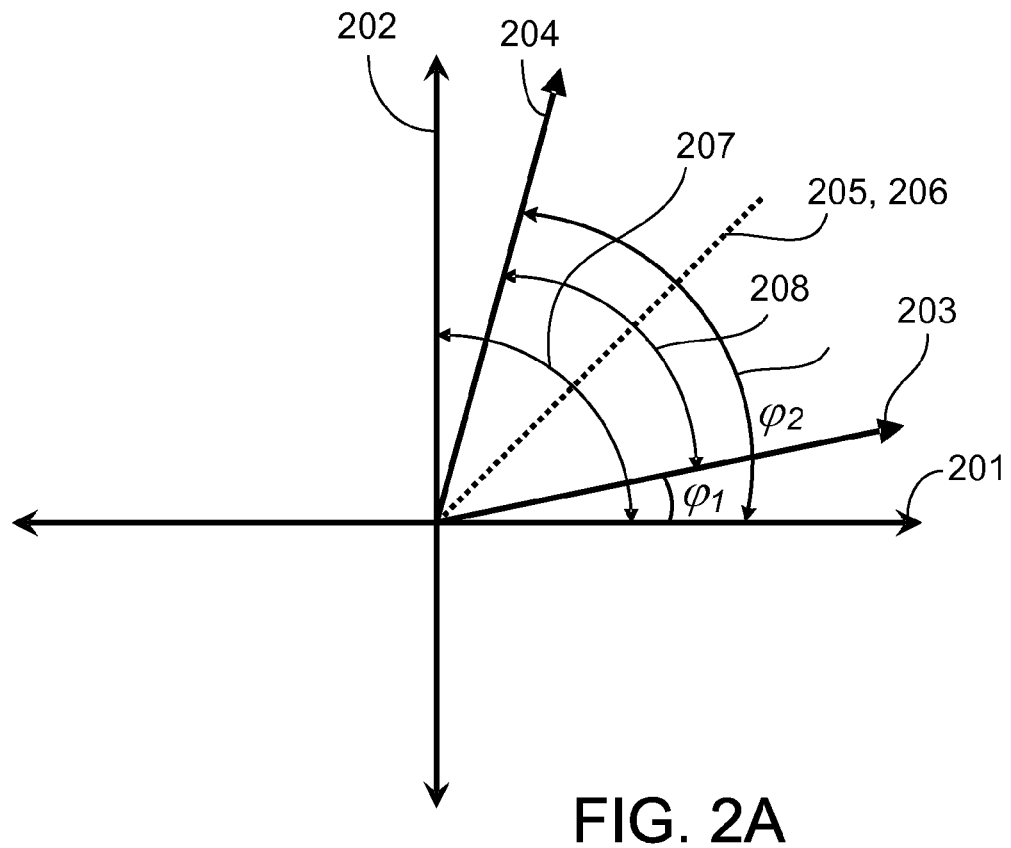
FIG. 2A is a diagram showing the optical axes of polarizers and alignment films.

FIG. 2A shows the optical axes of the polarizers 180a, 180b and the alignment films 184a, 184b. The polarizing films 180a and 180b are in crossed configuration, i.e., the lower polarizing film 180b has a transmission axis 201 that is orthogonal to the transmission axis 202 of the upper polarizing film 180a. The lower alignment layer 184b is associated with a tilt direction 203 (also referred to as an alignment direction), and the upper alignment layer 184a is associated with a tilt direction 204. The angle 208 between the tilt directions 203 and 204 can be, e.g., about 90 degrees. In some examples, the angle 208 is between, e.g., 60 degrees to 120 degrees, or 80 to 100 degrees. In some examples, the bisector 205 of the angle 207 between the axes 201 and 202 can be, e.g., parallel to the bisector 206 of the angle between the tilt directions 203 and 204.

Figure 2B:
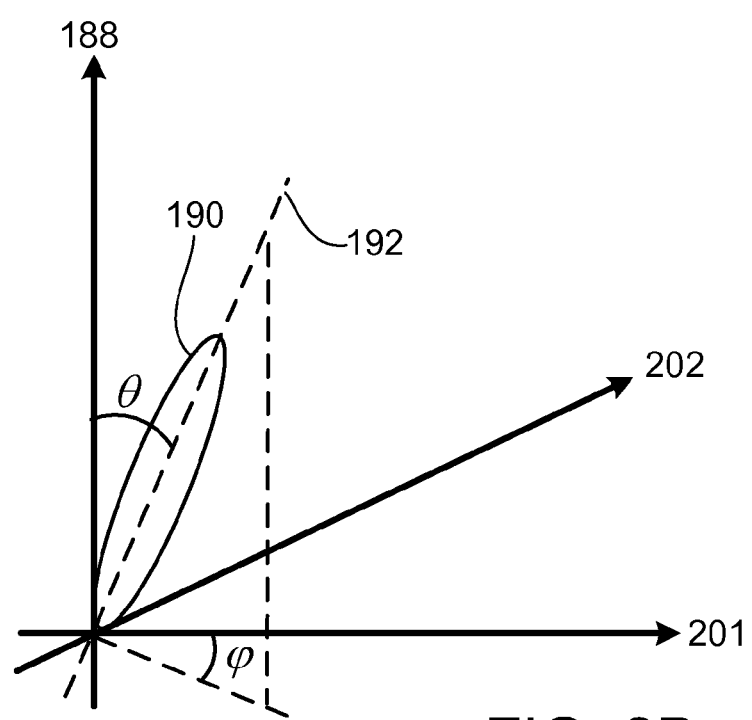
FIG. 2B is a diagram showing the tilt direction of a liquid crystal molecule.

FIG. 2B shows the tilt direction of a director 192 of a liquid crystal molecule 190 relative to the axes 201, 202, and the vertical direction 188. When the voltage Vdata is above the threshold, due to the negative anisotropy of the liquid crystal molecules, the liquid crystal molecule 190 tilts away from the vertical direction 188, such that the liquid crystal molecule 190 has a tilt angle θ with respect to the vertical direction 188 and an azimuth angle (p with respect to the axis 201 (i.e., the projection of the director 192 on the horizontal plane has an angle φ with respect to the axis 201).

The azimuth angle φ is affected by two factors. The first factor is the effect of the alignment layers 184a and 184b. Because the liquid crystal molecules adjacent to the alignment layers 184a and 184b have different tilt directions 203 and 204 (FIG. 2A), this tends to induce a twisted structure (similar to a helix) in the liquid crystal layer 172 when the pixel is in the operation state (i.e., when the voltage Vdata is above the threshold).

The liquid crystal molecules adjacent to the lower alignment film 184b tilt toward direction 203, while the liquid crystal molecules adjacent to the upper alignment film 184a tilt toward direction 204. If there were no chiral material in the liquid crystal layer 172, the liquid crystal molecules would have a counter clockwise twisted structure. Considering liquid crystal molecules at different positions along the vertical direction 188, the tilt directions of the liquid crystal molecules would gradually change from the direction 203 to the direction 204 (the angle (p gradually increases from φ1 to φ2) as their positions move from near the lower alignment film 184b to near the upper alignment film 184a, forming a counter clockwise twisted structure.

The second factor that affects the angle (p is the twist direction induced by the chiral material. The chiral material is selected to induce a twist direction that is opposite to the twist direction induced by the alignment layers 184a and 184b. In this example, the chiral material is selected to be a left-handed chiral material that induces a clockwise twist. The amount of chiral material in the liquid crystal layer 172 is sufficiently large so that the twist effect induced by the chiral material affects the twist effect induced by the alignment layers. The amount (or percentage) of chiral material in the liquid crystal layer 172 can be determined using, for example, the relationship p=1/(HTP×c). Here, p represents a helical pitch induced by the chiral dopant, HTP is a helical twisting power that represents the ability of the chiral dopant to twist the nematic phase of the liquid crystal and is dependent on the chiral material being used, and c represents a concentration ratio (weight %) of the chiral dopant.

The alignment layers 184a, 184b exert more influence on the liquid crystal molecules that are closer to the alignment layers, as compared to liquid crystal molecules near the middle of the liquid crystal layer 172 that are farther away from the alignment layers 184a, 184b. Thus, when a voltage of a certain range is applied cross the liquid crystal layer 172, the liquid crystal molecules near the middle of the liquid crystal layer 172 may have a twist direction that is opposite to the twist direction of liquid crystal molecules that are adjacent to the alignment layers 184a, 184b. As a result of the interaction of the opposite twist effects from the chiral material and the alignment films 184a, 184b, the liquid crystal layer 172 can have a particular twisted structure to allow the liquid crystal display 170 to have improved display characteristics and a lower operation voltage compared to an example of a chiral homeotropic mode LCD.

In some examples, the tilt direction 204 (of the upper alignment film 184a) is at an angle less than 180 degrees relative to the tilt direction 203 (of the lower alignment film 184b) when the angle is measured clockwise from the tilt direction 203 to the tilt direction 204, the chiral material is selected to be a right-handed chiral material that induces a counter-clockwise twist.

Figure 3A:
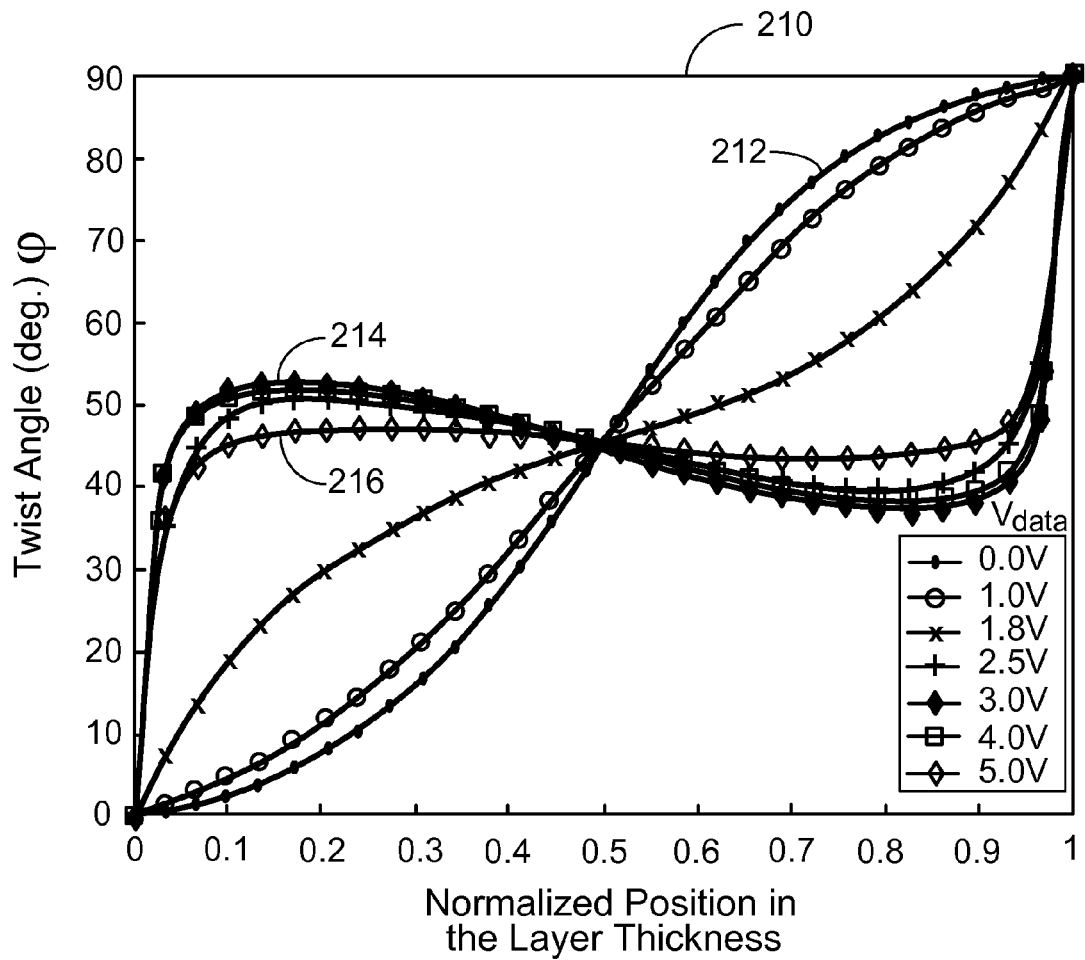
FIGS. 3A and 3B are graphs showing the voltage-dependent twist characteristics of liquid crystal layers.

FIG. 3A is a graph 210 that shows curves (e.g., 212, 214, 216) representing the twisted structure of the liquid crystal layer 172 when a particular voltage Vdata is applied to the liquid crystal layer 172. The example of FIG. 3A assumes that the angle between the alignment directions of the upper and lower alignment films 184a, 184b are approximately 90 degrees. Each curve in the graph 210 represents the angle φ of the liquid crystal molecules at different positions in the liquid crystal layer 172. The horizontal axis of FIG. 3A represents the normalized positions of the liquid crystal molecules along the direction 188 of FIG. 1, "0" being near the lower alignment film 184b and "1" being near the upper alignment film 184a. The vertical axis of FIG. 3A represents the azimuth angle φ.

The twisted structure of the liquid crystal layer 172 changes as the voltage Vdata increases from 0 V to 5 V. When the voltage Vdata is below the threshold voltage (e.g., about 2 volts), the azimuthal angle of the molecules adjacent to the bottom and top substrates are 0 and +90, respectively, and the molecules between the bottom and top substrates form a counter clockwise twisted configuration in which the twist angle gradually changes from 0 to +90 degrees. As can be seen from the curve 212, when Vdata=0V, the azimuth angle φ gradually changes from 0 to 90 degrees.

When the voltage Vdata is higher than the threshold voltage (e.g., Vdata=3V), the azimuthal angle of the molecules adjacent to the bottom and top substrates are 0 and +90, respectively. The molecules near the bottom substrate (e.g., normalized positions 0 to 0.15) form a counter clockwise twisted configuration in which the twist angle changes quickly from 0 to about +45 degrees. The bulk area (e.g., normalized positions 0.15 to 0.85) of the liquid crystal layer 172 has no twist, or is slightly twisted in the opposite direction (clockwise in this example), compared to the twist direction near the alignment films 184a and 184b. The molecules near the top substrate (e.g., normalized positions 0.85 to 1) form a counter clockwise twisted configuration in which the twist angle changes quickly from about +45 degrees to +90 degrees.

When the twist angle profile (e.g., 212, 214, 216 of FIG. 3A) of the liquid crystal cell is considered as a function of normalized cell gap, the slope or inclination of the function correlates to the twist direction. For example, the twist direction is counter clockwise if the inclination is positive, and the twist direction is clockwise if the inclination is negative.

As can be seen from the curve 214, when Vdata=3V, for the normalized positions between 0 to about 0.15, the twisted structure has a counter clockwise twist. For the normalized positions between about 0.15 to about 0.85, the twisted structure has a clockwise twist. For the normalized positions between about 0.85 to 1, the twisted structure has a counter clockwise twist.

As can be seen from the curve 216, when Vdata=5V, for the normalized positions between 0 to about 0.2, the twisted structure has a counter clockwise twist. For the normalized positions between about 0.2 to about 0.8, the twisted structure is almost constant ((p is maintained at about +45 degrees). For the normalized positions between about 0.8 to 1, the twisted structure has a counter clockwise twist.

As a result, the liquid crystal layer 172 has larger twists at regions near the alignment layers 184a, 184b and a smaller twist in the bulk area. This is caused by the competition between the twists induced by the alignment layers and the chiral material.

Figure 3B:
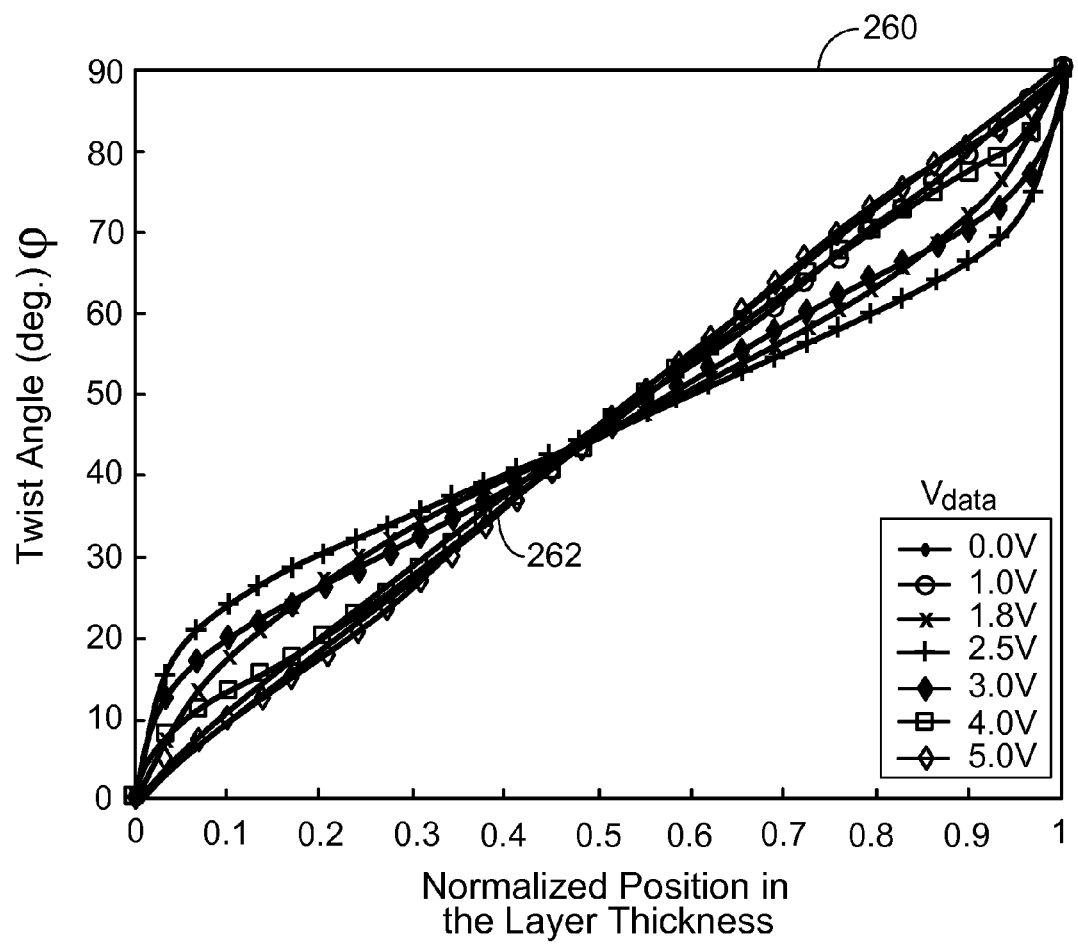

By comparison, FIG. 3B is a graph 260 that shows curves 262 representing the twisted structure of the liquid crystal layer of an example of a conventional chiral homeotropic mode LCD when different voltages are applied across the liquid crystal layer. The liquid crystal layer of the chiral homeotropic mode LCD maintains a twisted structure when the operation voltage varies from 0 V to 5 V, in which the twist direction remains the same throughout the liquid crystal layer.

The difference in twisted structure between the liquid crystal display 170 (FIG. 1) and the example of the conventional chiral homeotropic mode LCD results in different optical characteristics, as described below. The data used in FIGS. 3A-5B and 7-10 were obtained by simulation.

Figure 4:
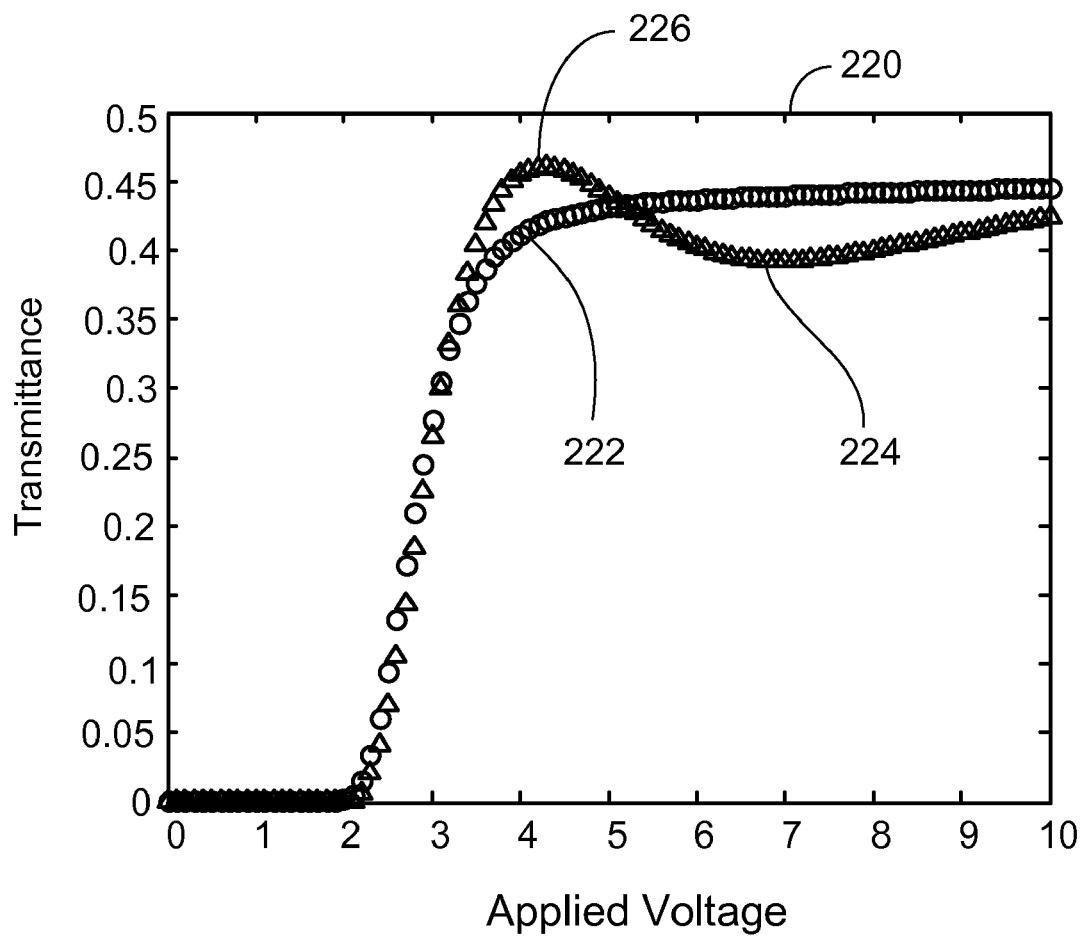
FIG. 4 is a graph comparing the voltage-dependent transmittance characteristics of different types of displays.

FIG. 4 is a graph 220 showing curves 222 and 224 representing the transmittance characteristics of an example of a conventional chiral homeotropic mode LCD and the liquid crystal display 170 (FIG. 1), respectively. The simulations used for deriving data for the curves 222 and 224 use the same liquid crystal materials. In the example of the conventional chiral homeotropic mode LCD, the twist direction induced by the chiral material is the same as the twist direction induced by the alignment layers. In the liquid crystal display 170, the twist direction induced by the chiral material is opposite to the twist direction induced by the alignment layers. The wavelength used in the simulations is 550 nanometers. A comparison of curves 222 and 224 shows that a lower driving voltage can be used for the liquid crystal display 170 to reach a maximum brightness 226.

Figure 5B:
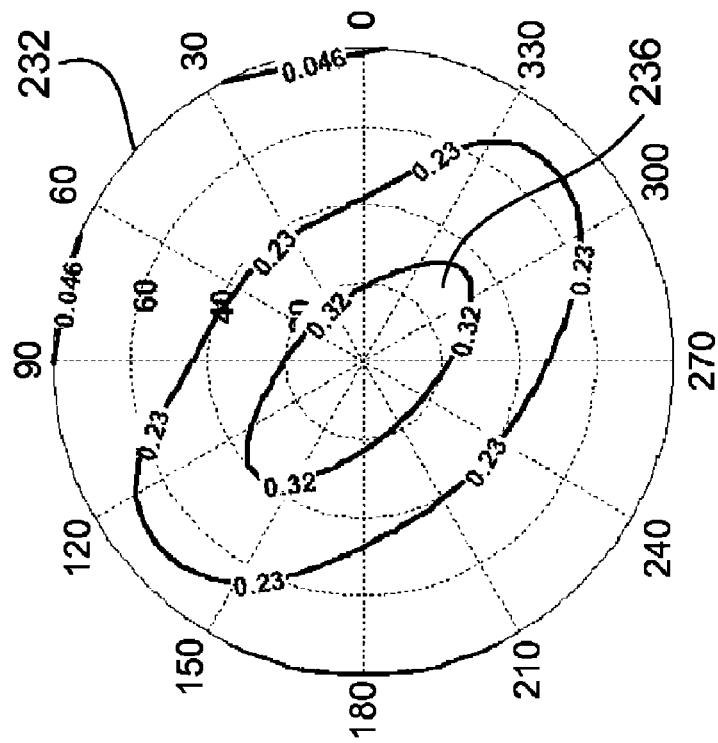
FIGS. 5A and 5B are iso-luminance graphs.
Figure 5A:
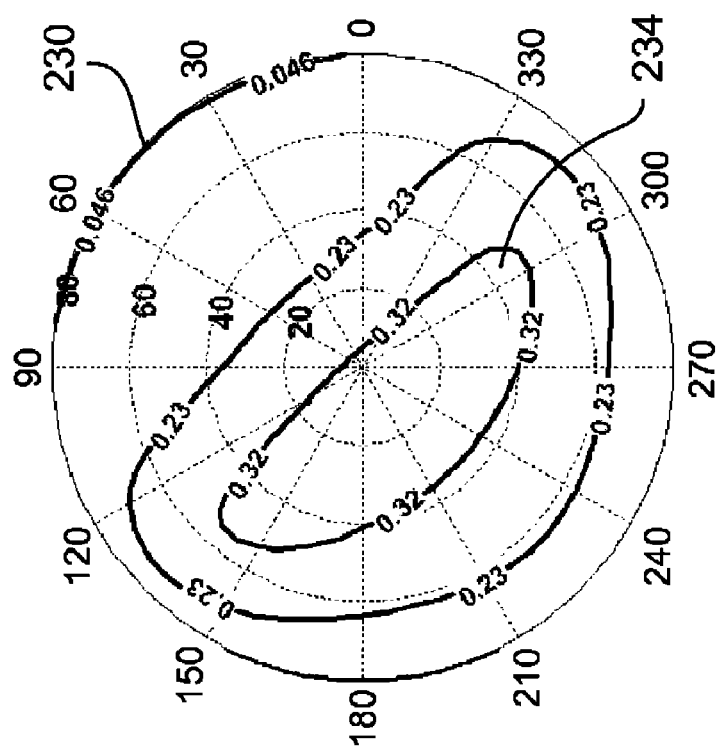

FIGS. 5A and 5B show iso-luminance graphs 230 and 232 of the example of the conventional chiral homeotropic mode LCD and the liquid crystal display 170 (FIG. 1), respectively, in the operation state. The iso-luminance graph 230 shows that the maximum transmittance position (within region 234) of the example of the conventional chiral homeotropic mode LCD is offset from the center position. The iso-luminance graph 232 shows that the maximum transmittance position (within region 236) of the liquid crystal display 170 is near the center position. The luminance distribution of the liquid crystal display 170 (as shown in the graph 232) is more symmetric with respect to the center of the display than the luminance distribution of the example of the conventional chiral homeotropic mode LCD.

A transflective liquid crystal display can show an image in a transmissive display mode and a reflective display mode independently or simultaneously, so that the transflective liquid crystal display can be used in either dark or bright ambient conditions. In a transflective liquid crystal display, some amount of incident ambient light is reflected back to the viewer, and some amount of backlight is transmitted through the liquid crystal layer to the viewer. The reflected and transmitted light may be provided to the view independently or simultaneously.

Figure 6:
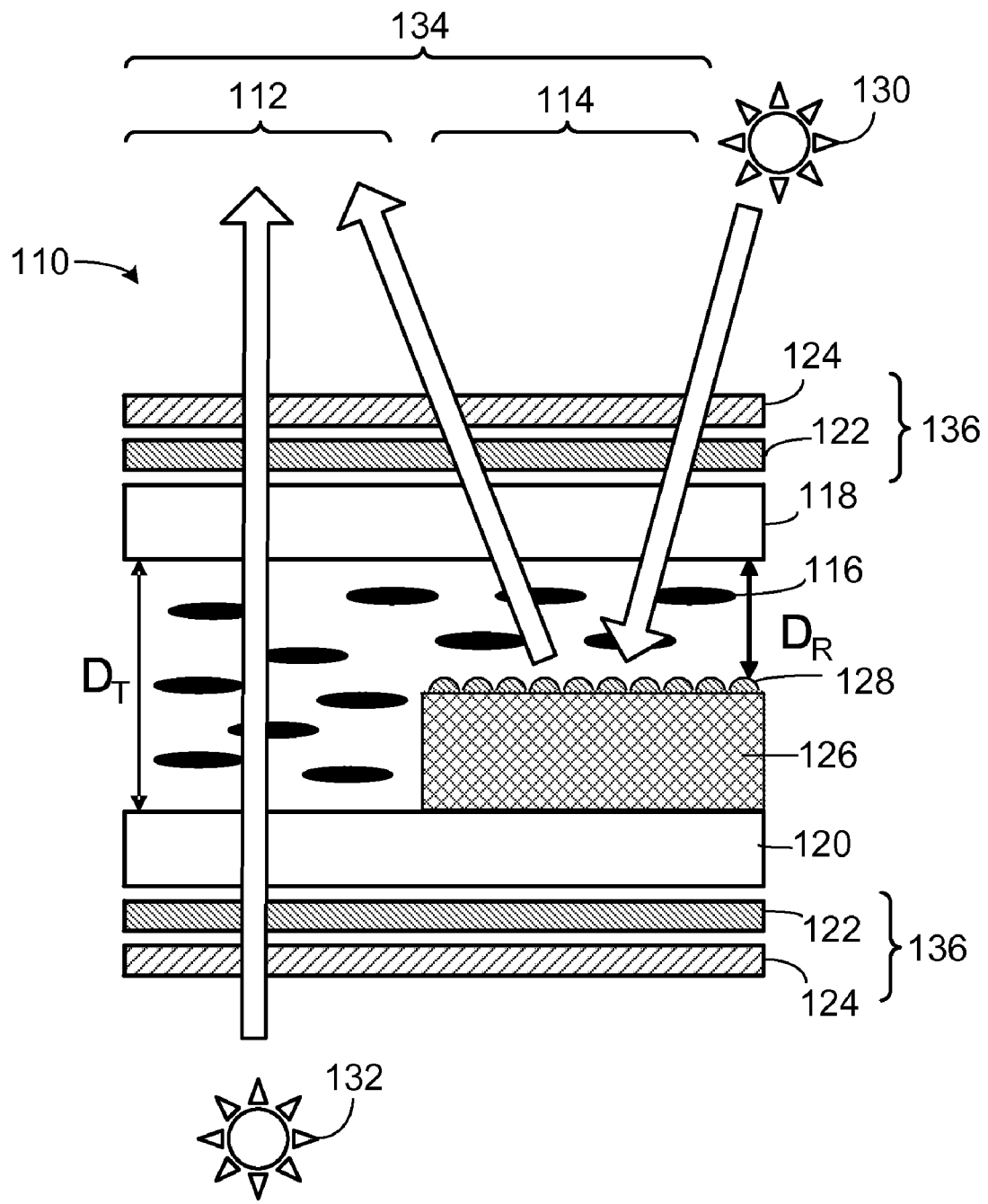
FIG. 6 is a schematic diagram of a transflective liquid crystal display.

FIG. 6 is a schematic diagram of a transflective liquid crystal display 110. One pixel 134 is shown in the figure. Similar to the transmissive display 170 (FIG. 1), the transflective liquid crystal display 110 has a liquid crystal layer 116 positioned between a top substrate 118 and a bottom substrate 120. A broadband quarter wave retardation film 122 is attached on the outer side of each substrate 118 and 120. A linear polarizing film 124 is attached to each retardation film 122 to form a broadband circular polarizer 136. The upper and lower polarizing films 124 are crossed so that the upper and lower broadband circular polarizers block out the transmitted and reflected light when the pixel is not activated (i.e., when the pixel is in the dark state). The inner side of the top substrate 118 has a transparent electrode coated with an alignment layer.

Different from the transmissive display 170, the transflective liquid crystal display 110 includes a transmissive part 112 and a reflective part 114. In the transmissive part 112, the bottom substrate 120 has a transparent electrode coated with an alignment layer. In the reflective part 114, the bottom substrate 120 has a buffer layer 126 coated with a metal reflector 128 that is used to reflect the ambient light or light coming from an external light source 130. The surface of the buffer layer 126 is uneven or bumpy so that the surface of the metal reflector 128 is also uneven or bumpy, thereby reflecting the incident light in a range of directions. The transmissive part 112 transmits light from a backlight unit 132. The transmissive part 112 and the reflective part 114 of the same pixel are operated by the same switching device, such as a thin film transistor (see FIG. 11).

The transflective liquid crystal display 110 modulates light to generate images having varying gray scale levels by using the electro-optic effect described above. Light in the transmissive part 112 passes the liquid crystal layer 116 once, whereas light in the reflective part 114 passes the liquid crystal layer 116 twice because the light is reflected from the reflector 128. By using the buffer layer 126 to form a dual cell gap structure, in which the thickness of the liquid crystal layer 116 in the reflective part 114 is smaller than that of the transmissive part 112, the optical phase retardation of light in the transmissive part 112 and the reflective part 114 can be substantially the same. See U.S. Pat. No. 6,281,952.

Figure 7:
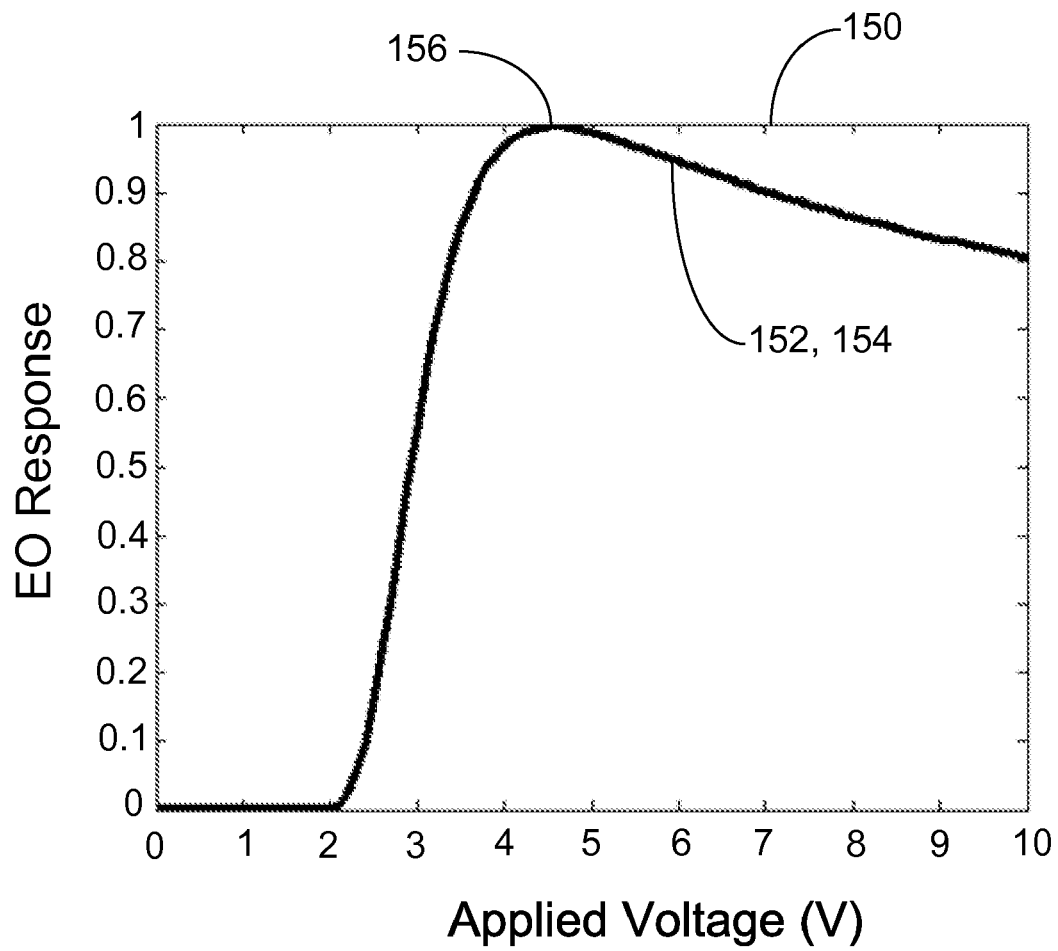
FIG. 7 is a graph showing the voltage-dependent transmittance and reflectance characteristics of an ECB VA mode transflective LCD.

FIG. 7 is a graph 150 showing curves 152 and 154 representing the transmittance characteristic and reflectance characteristic, respectively, of an example of a conventional ECB VA mode transflective LCD, in which the liquid crystal layer is not doped with a chiral material. The vertical axis in graph 150 represents a normalized electro-optic response of the transmissive part and the reflective part of the example of the conventional ECB VA mode transflective LCD. A comparison of curves 152 and 154 shows that, in the example of the conventional ECB VA mode transflective LCD, the transmittance and reflectance characteristics are substantially the same.

Figure 8:
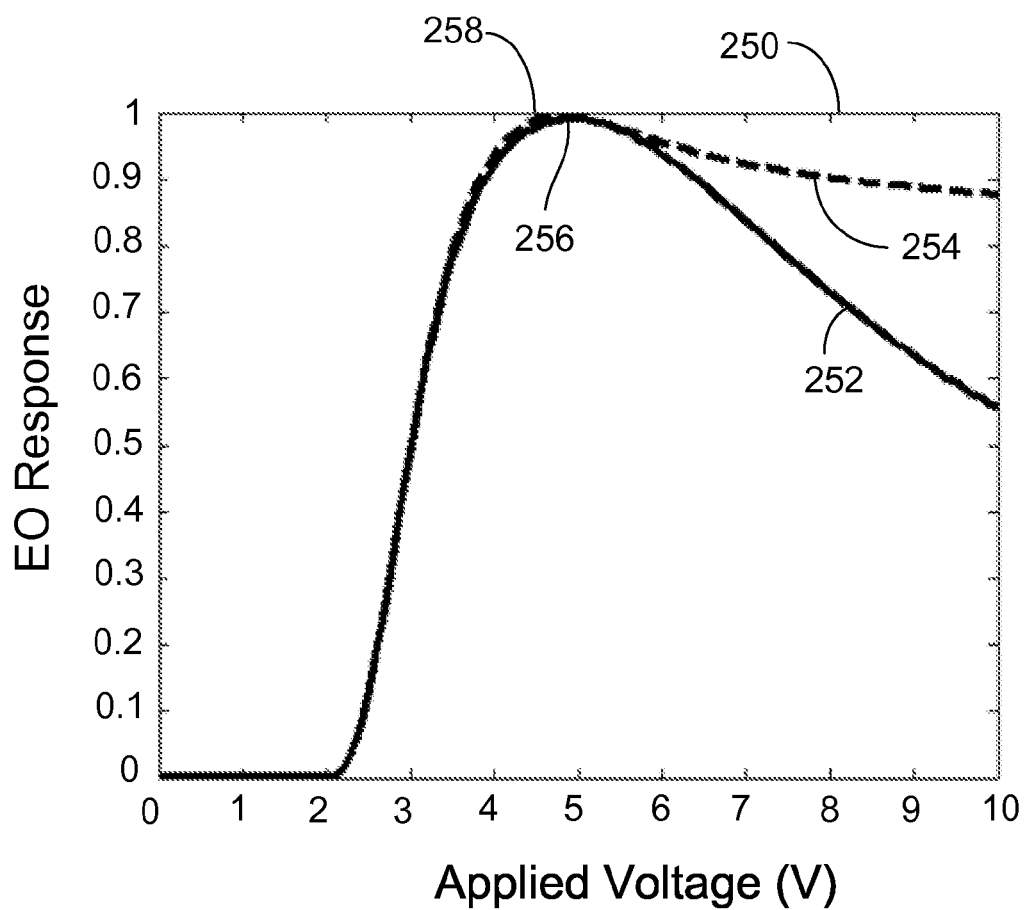
FIG. 8 is a graph showing the transmittance and reflectance characteristics of a transflective display.

FIG. 8 is a graph 250 showing curves 252 and 254 representing the transmittance and reflectance characteristics of the transmissive part 112 and the reflective part 114, respectively, of the transflective liquid crystal display 110 (FIG. 6). The vertical axis in graph 250 represents an electro-optic response of the transmissive part 112 and the reflective part 114 normalized against the maximum transmittance value of the example of the conventional ECB VA mode display. An electro-optic response of 1 means that the transmittance or the reflectance is the same as that of the example of the ECB VA mode transflective LCD (FIG. 7).

FIG. 8 shows that the maximum transmittance 256 and the maximum reflectance 258 of the transflective liquid crystal display 110 are substantially the same as those of the example of the conventional ECB VA mode transflective LCD. This may be because when an operating voltage of 2.5 V to 5 V is applied to the liquid crystal layer 116 of the display 110, the bulk of the liquid crystal layer 116 has an azimuth angle φ that is substantially the same (about 45±8 degrees). This is similar to the situation in the example of the conventional ECB VA display, in which the bulk of the liquid crystal molecules are tilted along substantially the same direction (having an azimuth angle of about 45 degrees) when an operating voltage is applied to the liquid crystal layer.

The curves 252 and 254 substantially match each other when the operating voltage is between 0V to about 5V. This indicates that when a data voltage Vdata is applied to a pixel of the transflective liquid crystal display 110, the transmissive part 112 and the reflective part 114 will have substantial the same gray scale level.

Figure 9:
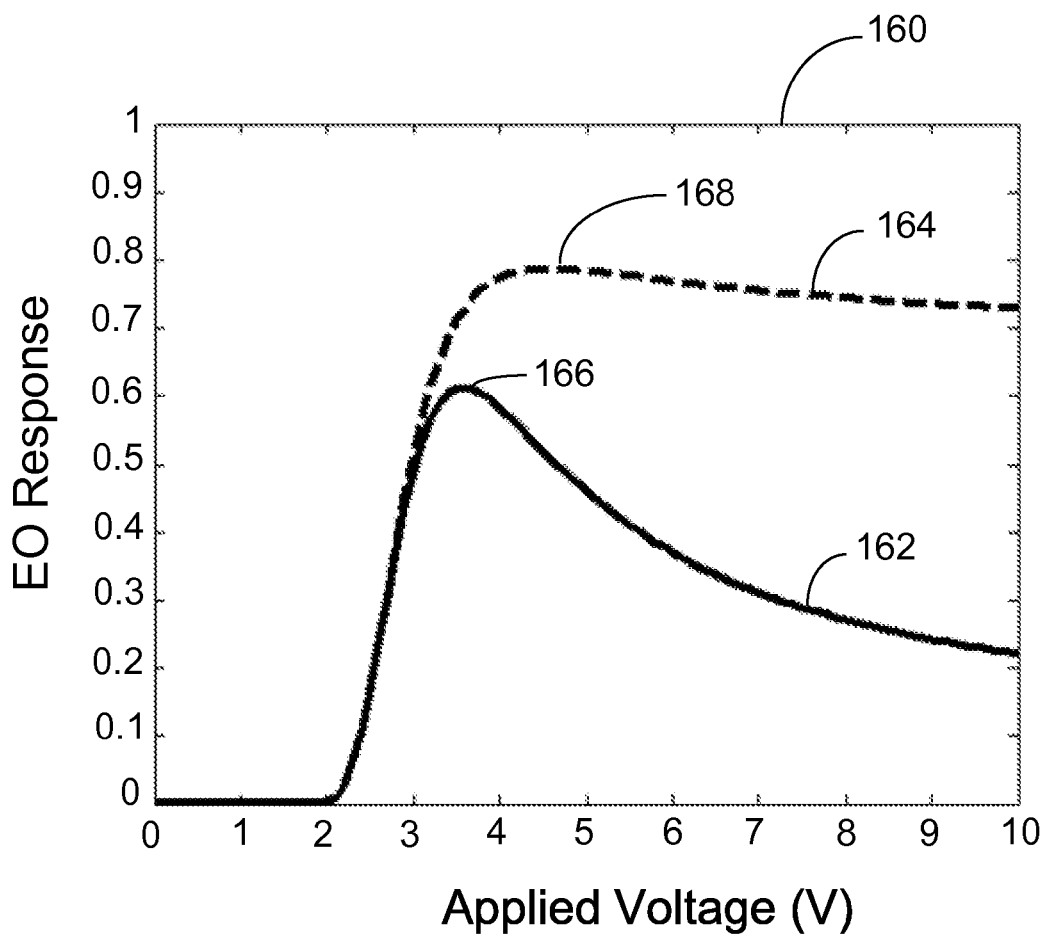
FIG. 9 is a graph showing the transmittance and reflectance characteristics of a chiral homeotropic mode LCD.

FIG. 9 is a graph 160 showing curves 162 and 164 that represent the transmittance and reflectance electro-optic responses, respectively, of an example of a conventional chiral homeotropic mode LCD relative to those of the example of the conventional ECB VA mode LCD. The maximum value 166 of the transmittance 162 and the maximum value 168 of the reflectance 164 are about 60% and 80%, respectively, of the maximum corresponding values of the example of the conventional ECB VA mode LCD (FIG. 7). The curves 162 and 164 do not substantially match each other when the applied voltage is between 3V to 4V, resulting in distortion of gray scale levels.

A comparison of FIGS. 8 and 9 shows that the transflective liquid crystal display 110 has better display characteristics than the example of the conventional chiral homeotropic transflective display.

Figure 10:
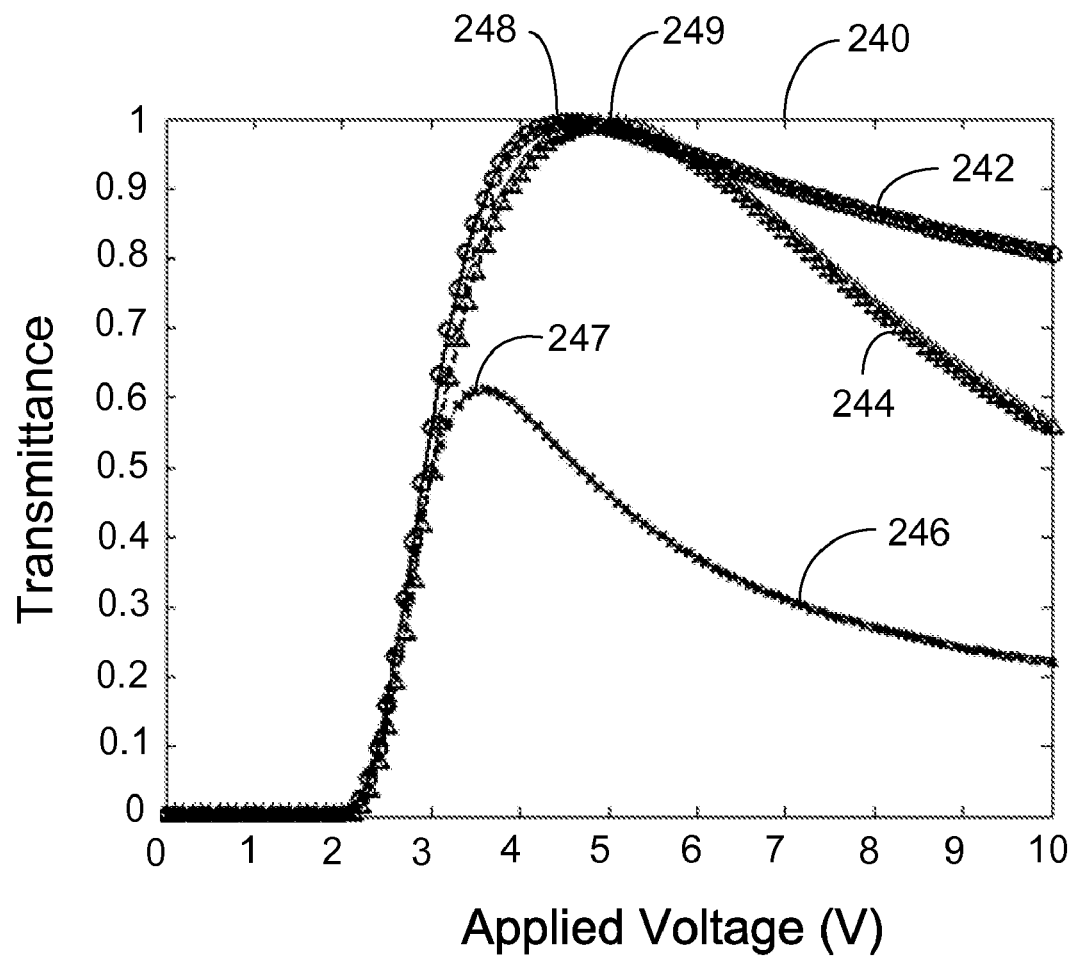
FIG. 10 is a graph showing the voltage-dependent transmittance characteristics of different types of displays.

FIG. 10 is a graph 240 showing curves 242, 244, and 246 representing the transmittance characteristics of the transmissive part of the example of the conventional ECB VA mode transflective LCD, the transflective LCD 110 (FIG. 6), and the example of the conventional chiral homeotropic mode LCD, respectively. The transflective displays use broadband circular polarizers. In the case of the example of the conventional chiral homeotropic mode LCD (curve 246), the maximum transmittance 247 is less than two-thirds of the maximum transmittance 248 of the example of the conventional ECB VA mode LCD (curve 242). By comparison, the liquid crystal display 170 (curve 244) has a maximum transmittance 249 that is close to the maximum transmittance 248 of the example of the conventional ECB VA mode LCD.

In terms of maximum brightness, liquid crystal display 110 or 170 is as good as the example of the conventional ECB VA mode LCD. An advantage of the liquid crystal display 110 or 170 is that, in the bright state, the polarization of light is changed as it passes through the liquid crystal layer due to two effects: (i) the polarization rotating (wave guiding) effect caused by twisted structure of liquid crystal layer and (ii) the phase retardation effect caused by the reversely twisted structure (or structure having substantially no twist) in the bulk area. The LCD 110 or 170 has less color dispersion, as compared to the example of the conventional ECB VA mode LCD that changes the polarization of light by using the retardation effect without the wave guiding effect.

Figure 11:
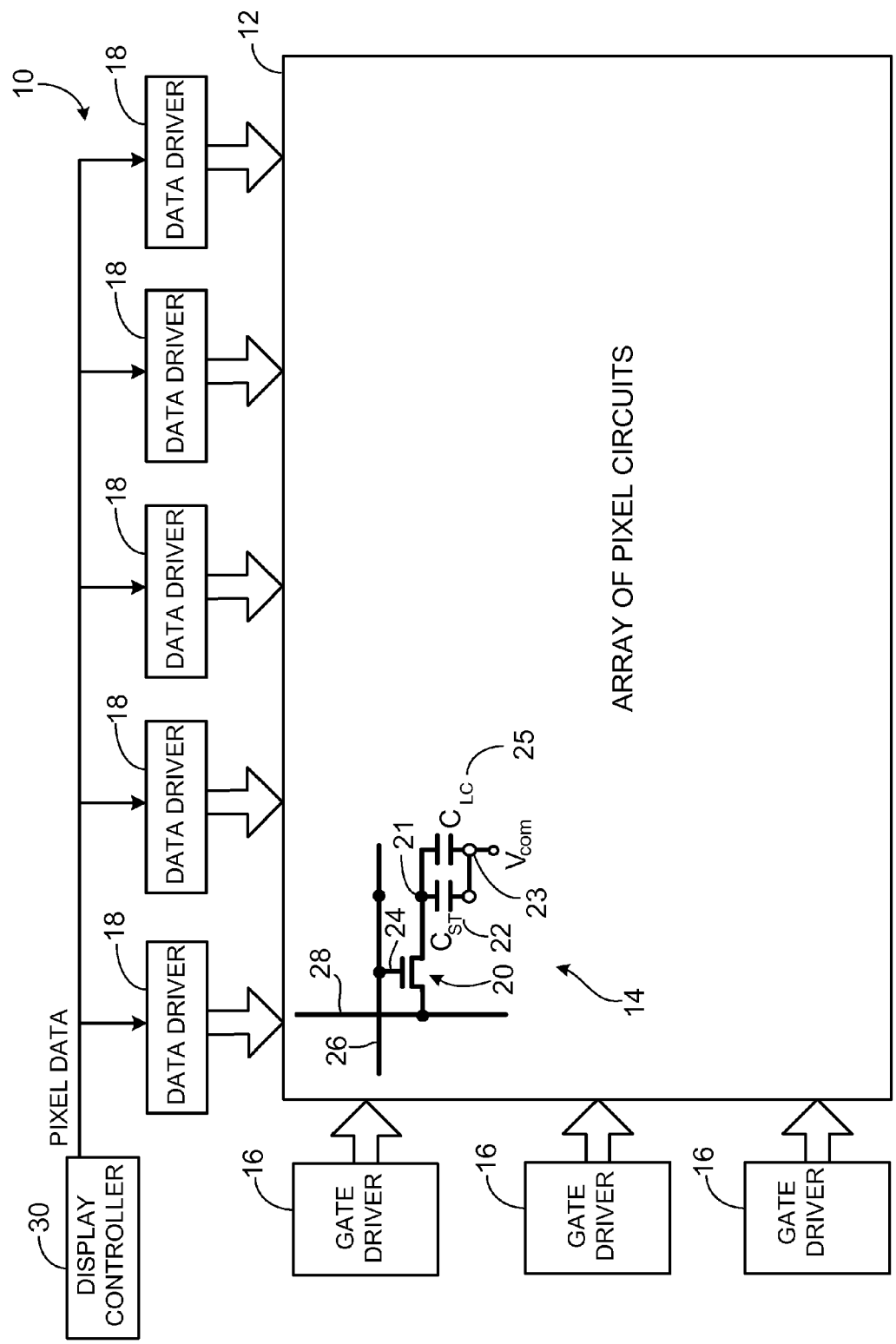
FIG. 11 a diagram of a liquid crystal display that includes an array of pixel circuits.

FIG. 11 is a diagram of an example of a liquid crystal display 10 that includes an array 12 of pixel circuits 14 that are controlled by one or more gate drivers 16 and one or more data drivers 18. Each pixel circuit 14 includes one or more thin film transistors (TFT) 20, a storage capacitor $C_{ST}$ 22, and a liquid crystal cell (not shown). The liquid crystal cell can have a configuration similar to those shown in FIGS. 1 or 6. The liquid crystal cell has an effective capacitance, represented by $C_{LC}$ 25. The capacitors $C_{ST}$ 22 and $C_{LC}$ 25 can be, e.g., connected in parallel to a first node 21 and a second node 23. The TFT 20 includes a gate 24 that is connected to a gate line 26, which is connected to the gate driver 16. When the gate driver 16 drives the gate line 26 to turn on the TFT 20, the data driver 18 simultaneously drives a data line 28 with a voltage signal (e.g., Vdata), which is passed to the capacitors $C_{ST}$ 22 and $C_{LC}$ 25.

In some examples, the first and second nodes 21 and 23 are connected to two transparent electrodes (e.g., 182a and 182b of FIG. 1), respectively, that are positioned on two sides of the liquid crystal cell. The voltage (e.g., Vdata) held by the capacitors $C_{ST}$ 22 and $C_{LC}$ 25 determines the voltage applied to the liquid crystal cell. The voltage on the data line 28 is sometimes referred to as a "gray scale voltage" because it determines the gray scale level shown by the pixel circuit 14.

Each pixel on the display 10 includes three sub-pixels for displaying red, green, and blue colors. Each sub-pixel includes a pixel circuit 14. By controlling the gray scale levels of the three sub-pixels, each pixel can display a wide range of colors and gray scale levels.

Although some examples have been discussed above, other implementations and applications are also within the scope of the following claims. For example, the use of a liquid crystal layer having a chiral material that induces a twisted structure having a twist direction opposite to the twist direction induced by the alignment layers can also be used in a reflective display that does not have a backlight module. The chiral materials can be different from those described above. The dimensions and orientations of various components of the display can be different from those described above.

Figure 12:
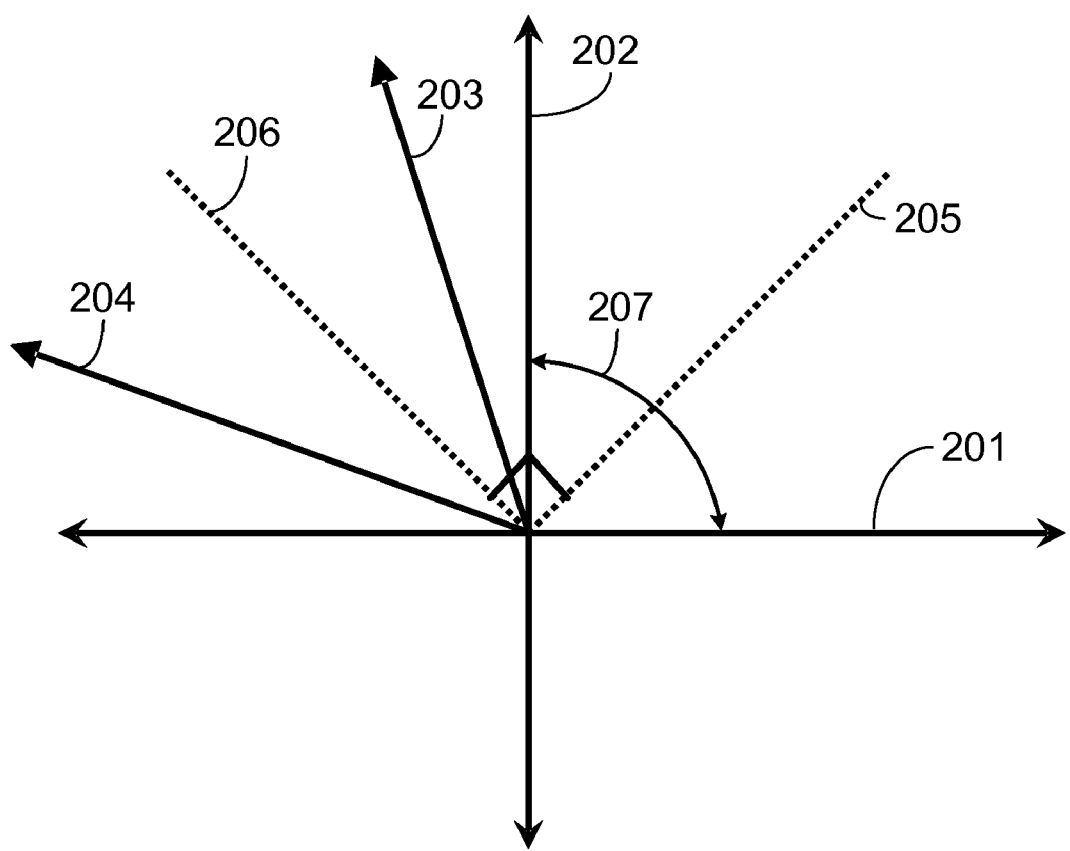
FIG. 12 is a diagram showing the optical axes of polarizers and alignment films.

For example, referring to FIG. 12, in some examples, the bisector 205 of the angle 207 between the axes 201 and 202 can be orthogonal to the bisector 206 of the angle between the tilt directions 203 and 204 (as compared to FIG. 2A, in which the bisector 205 of the angle 207 is parallel to the bisector 206 of the angle between the tilt directions 203 and 204). The pixel circuits can have different arrangements, e.g., a terminal of the storage capacitor $C_{ST}$ can be connected to the node 21 and the other terminal of the storage capacitor can be connected to the gate line of the next row.

In the transflective display 110 of FIG. 6, the transmissive part 112 and the reflective part 114 of the same pixel can be controlled by using two separate switching devices. The transmissive part 112 can be part of one pixel, and the reflective part 114 can be part of another pixel. The transflective display 110 does not have to use a dual cell gap structure. The buffer layer 126 can be removed so that the cell gap is the same for the transmissive part 112 and the reflective part 114.

The orientations of the liquid crystal molecules described above refer to the directions of directors of the liquid crystal molecules. The molecules do not necessarily all point to the same direction all the time. The molecules may tend to point more in one direction (represented by the director) over time than other directions. For example, the phrase "the liquid crystal molecules are substantially aligned along a direction normal to the substrates" means that the average direction of the directors of the liquid crystal molecules are aligned along the normal direction, but the individual molecules may point to different directions. The chiral material may have impurities. For example, a liquid crystal layer doped with a right-handed (or left-handed) chiral material may include a small percentage of left-handed (or right-handed) chiral material, but the twist direction of the twisted structure in the liquid crystal layer is mainly determined by the right-handed (or left-handed) chiral material.

What is claimed is:
1. An apparatus comprising:
 a liquid crystal display comprising
  a first alignment film having a first alignment direction;
  a second alignment film having a second alignment direction; and a liquid crystal layer having liquid crystal molecules between the first and second alignment films, the liquid crystal layer being doped with a chiral material, wherein the chiral material tends to induce a first twist effect in directors of the liquid crystal molecules when an electric field is applied to the liquid crystal layer, the first and second alignment films having orientations that tends to induce a second twist effect in the directors when an electric field is applied to the liquid crystal layer, the direction of the first twist effect being different from the direction of the second twist effect.

2. The apparatus of claim 1 wherein the first and second alignment films tend to induce a counter-clockwise twist in the directors of the liquid crystal molecules.

3. The apparatus of claim 2 wherein the chiral material tends to induce a clockwise twist in the directors.

4. The apparatus of claim 1 wherein the orientations of the first and second alignment films tend to induce a clockwise twist in the directors of the liquid crystal molecules.

5. The apparatus of claim 4 wherein the chiral material tends to induce a counter- clockwise twist in the directors.

6. The apparatus of claim 1 wherein when a pixel of the liquid crystal display is in a bright state, at least one-tenth of the liquid crystal molecules in the pixel form a twisted structure having a twist direction induced by the chiral material, another twisted structure formed by the liquid crystal molecules adjacent to the first and second alignment films having another twist direction opposite to the twist direction induced by the chiral material.

7. The apparatus of claim 1 wherein when a pixel of the liquid crystal display is in a bright state, at least one-half of the liquid crystal molecules in the pixel form a twisted structure having a twist direction induced by the chiral material, another twisted structure formed by the liquid crystal molecules adjacent to the first and second alignment films having another twist direction opposite to the twist direction induced by the chiral material.

8. The apparatus of claim 1 wherein the liquid crystal molecules are substantially normal to the first and second alignment films when no voltage is applied to the liquid crystal layer, and the liquid crystal modules tilt away from the substantially normal direction when an electric field is applied to the liquid crystal layer.

9. The apparatus of claim 1 wherein the first alignment layer is attached to a first substrate and the second alignment layer is attached to a second substrate.

10. The apparatus of claim 1 wherein the liquid crystal layer comprises negative dielectric anisotropy liquid crystal material.

11. The apparatus of claim 1, further comprising a backlight to provide light that is modulated by the liquid crystal layer.

12. The apparatus of claim 1, further comprising electrodes to apply the voltage to the liquid crystal layer.

13. The apparatus of claim 1, further comprising a first polarizing film having a first transmission axis and a second polarizing film having a second transmission axis, the first transmission axis being at an angle relative to the second transmission axis, the first and second polarizing films being positioned at opposite sides of the liquid crystal layer.

14. The apparatus of claim 13 wherein the bisector of the angle between the first alignment direction of the first alignment layer and the second alignment direction of the second alignment layer is substantially parallel to the bisector of the angle between the first and second transmission axes.

15. The apparatus of claim 13 wherein the bisector of the angle between the first and second alignment layers is substantially orthogonal to the bisector of the angle between the first and second transmission axes.

16. The apparatus of claim 1 wherein the display is at a dark state when no voltage is applied to the liquid crystal layer.

17. The apparatus of claim 1 wherein the first alignment direction is at an angle of 60 to 120 degrees with respect to the second alignment direction.

18. The apparatus of claim 1 wherein a pitch of a twist structure induced by the chiral material ranges from 3 to 6 times the thickness of the liquid crystal layer.

19. A transmissive type liquid crystal display comprising: a first substrate having a first electrode and a first alignment film; a second substrate having a second electrode and a second alignment film; a liquid crystal layer having liquid crystal molecules positioned between the first and second substrates, the liquid crystal layer being doped with a chiral material, wherein the chiral material tends to induce a twisted structure in the liquid crystal layer when an electric field is applied to the liquid crystal layer using the first and second electrodes, wherein the first alignment film has a first alignment direction, the second alignment film has a second alignment direction, the first and second alignment films having orientations that tends to induce another twisted structure in the liquid crystal layer when an electric field is applied to the liquid crystal layer, the direction of twist of the twisted structure induced by the first and second alignment films being different from the direction of twist of the twisted structure induced by the chiral material; and a backlight to generate light that is modulated by the liquid crystal layer.

20. The liquid crystal display of claim 19 wherein the liquid crystal molecules are substantially parallel to a direction perpendicular to the first and second substrates when no electric field is applied to the liquid crystal layer.

21. The liquid crystal display of claim 19 wherein the first and second alignment films tend to induce a counter-clockwise twist in the directors of the liquid crystal molecules.

22. The liquid crystal display of claim 21 wherein the chiral material tends to induce a clockwise twist in the directors.

23. The liquid crystal display of claim 19 wherein the first and second alignment films tend to induce a clockwise twist in the directors of the liquid crystal molecules.

24. The liquid crystal display of claim 23 wherein the chiral material tends to induce a counter-clockwise twist in the directors.

25. The liquid crystal display of claim 19, wherein when a pixel of the liquid crystal display is in a bright state, the directors of at least one-tenth of the liquid crystal molecules in the pixel twist in a twist direction induced by the chiral material, the directors of the liquid crystal molecules adjacent to the first and second alignment films twist in another direction opposite to the twist direction induced by the chiral material.

26. The liquid crystal display of claim 19 wherein when a pixel of the liquid crystal display is in a bright state, the directors of at least one-half of the liquid crystal molecules in the pixel twist in a twist direction induced by the chiral material, the directors of the liquid crystal molecules adjacent to the first and second alignment films twist in another direction opposite to the twist direction induced by the chiral material.

27. A liquid crystal display comprising: a pixel circuit having a dark state and a bright state, the pixel circuit comprising a lower alignment film having a first alignment direction; an upper alignment film having a second alignment direction, the upper alignment film being closer to a user when the user views the display; and a liquid crystal layer having liquid crystal molecules positioned between the first and second alignment films, the liquid crystal layer being doped with a chiral material that, when the pixel circuit is in the bright state, the chiral material induces at least one-tenth of the liquid crystal molecules that are farther away from the upper and lower alignment films to form a twisted structure having a first twist direction, another twisted structure formed by the liquid crystal molecules closer to the upper or lower alignment film having a second twist direction induced by the upper alignment film and the lower alignment film, wherein the first twist direction is opposite to the second twist direction.

28. The display of claim 27 wherein when the pixel circuit is in the bright state, the chiral material induces at least one-half of the liquid crystal molecules to form a twisted structure having the first twist direction, the twisted structure formed by the liquid crystal molecules closer to the upper or lower alignment film having the second twist direction induced by the upper alignment film and the lower alignment film, wherein the first twist direction is opposite to the second twist direction.

* * * * *